United States Patent
McKay et al.

(10) Patent No.: US 9,077,420 B2
(45) Date of Patent: Jul. 7, 2015

(54) RF RECEIVER WITH SIDEBAND SYMMETRY CIRCUIT

(71) Applicant: MStar Semiconductor, Inc., Hsinchu Hsien (TW)

(72) Inventors: Thomas McKay, Boulder Creek, CA (US); Jonathan Gowing, Santa Cruz, CA (US)

(73) Assignee: MStar Semiconductor, Inc., Hsinchu Hsien (TW)

( * ) Notice: Subject to any disclaimer, the term of this patent is extended or adjusted under 35 U.S.C. 154(b) by 224 days.

(21) Appl. No.: 13/774,809

(22) Filed: Feb. 22, 2013

(65) Prior Publication Data

US 2014/0242933 A1   Aug. 28, 2014

(51) Int. Cl.
*H04B 1/16* (2006.01)
*H04B 1/10* (2006.01)

(52) U.S. Cl.
CPC ........................................ *H04B 1/10* (2013.01)

(58) Field of Classification Search
CPC ............... H04B 1/18; H04B 1/28; H04B 1/30
USPC .......... 455/188.1, 189.1, 190.1, 193.1, 193.2, 455/196.1, 197.1, 197.2, 230, 313, 323, 334
See application file for complete search history.

(56) References Cited

U.S. PATENT DOCUMENTS

| | | | | |
|---|---|---|---|---|
| 5,953,643 | A * | 9/1999 | Speake et al. | 455/324 |
| 6,385,443 | B1 * | 5/2002 | Lee et al. | 455/324 |
| 8,005,448 | B1 * | 8/2011 | Yan et al. | 455/226.1 |
| 2007/0298750 | A1 * | 12/2007 | Masuda | 455/323 |

* cited by examiner

*Primary Examiner* — Nhan Le
(74) *Attorney, Agent, or Firm* — Edell, Shapiro & Finnan, LLC

(57) ABSTRACT

One aspect of the present invention includes an RF including a first mixer receiving an RF signal. A second mixer also receivers the RF signal. A resonant circuit couples to a common input of the first mixer and the second mixer. A second polyphase reactive circuit coupled to an output of the second mixer. In one embodiment, a direct current circuit coupled to the output of the first mixer, injecting direct current into the system. The resonant circuit is set at a resonance frequency such that a voltage across the second polyphase reactive circuit is a predetermined voltage.

8 Claims, 10 Drawing Sheets

RF RECEIVER WITH SIDEBAND SYMMETRY CIRCUIT

The present invention is related to U.S. Pat. No. 8,121,577, which is incorporated by reference herein.

FIELD OF INVENTION

The present invention relates to radio frequency (RF) receiver having mixers in the field of RF communications equipment such as cell phones and wireless LAN receiver.

BACKGROUND OF THE INVENTION

RF communications systems include RF receivers for receiving a desired RF signal on a specific RF channel (e.g., a desired bandwidth and a desired RF center frequency). One function of the RF receiver is to reject RF signals at frequencies other than those within the desired bandwidth of the desired RF channel. RF signals at bandwidths near the desired bandwidths are particularly troublesome.

One type of RF receiver is called super-heterodyning, in which received RF signals are mixed using mixers with a local oscillator (LO) signal to down convert the received RF signals into lower frequency signals, which are known as intermediate frequency (IF) signals. Generally, it is easier to filter out unwanted signals at IF frequencies than at higher RF frequencies.

Another type of RF receiver is called direct downconversion receiver. In this type of receiver, the received RF is mixed with LO signal at the carrier frequency of the received RF signal, and down converts the received signal directly to a baseband signal.

One type of down conversion using mixers is called quadrature down conversion. Quadrature down conversion produces two down-converted signals from the received RF signal. The down-converted signals are orthogonal, or 90 degrees out of phase, with each other. An in-phase mixer (or I mixer) mixes the received RF signal with a first or first set of local oscillator signals, producing a real down-converter signal (I signal). A quadrature mixer (or Q mixer) mixes the received RF signal with a second or second set of local oscillator signals, producing an imaginary down-converter signal (Q signal). The first and second local oscillator signals (or sets of local oscillator signals) are 90 degrees out of phase.

However, mixers have a characteristic that produces image signals in addition to desired signals. Image signals may be removed by RF filtering, IF filtering, or both. Bandpass filtering may be used to pass desired signals and remove interfering signals. Notch filtering may be used to target and reduce interfering signals at specific frequencies.

Another issue with RF receivers is sideband asymmetry in gains. The received RF signal within the desired bandwidth may experience different gains as frequency varies. For example, the received RF signal toward the upper side of the bandwidth is amplified differently than toward the lower side of the bandwidth.

The quality factor of a bandpass filter is a measure of the effectiveness of the filter at removing interfering signals at nearby frequencies, and is the bandwidth of the filter divided by the center frequency of the filter.

U.S. Pat. No. 8,121,577 introduced a filter embedded in the mixers. In that system, the output of a mixer is terminated with a polyphase reactive circuit, such as a capacitor. A mixer mixes RF input signals with LO signals and translates the impedance of the polyphase reactive circuit into the RF input impedance of the mixer. When fed from a high impedance source, such as a current source, the mixer provides a high quality factor (Q) impedance response associated with an impedance peak. The high-Q impedance response is used as a high-Q RF bandpass filter in a receive path upstream of down conversion, which improves receiver selectivity and replaces surface acoustic wave (SAW) or other RF filters.

SUMMARY OF THE INVENTION

One aspect of the present invention includes a method for receiving an RF signal and/or an RF receiver. The RF receiver includes a first mixer receiving an RF signal. A second mixer also receivers the RF signal. A resonant circuit couples to an input of the second mixer. A direct current circuit is coupled to the output of the first mixer inject a direct current thereto.

In another aspect of the present invention, a resonant frequency of the resonant circuit is set at a frequency such that a voltage on the output of the second mixer is a predetermined voltage.

In another aspect of the present invention, the predetermined voltage is zero or approximately zero (as understood in the art).

In another aspect of the present invention, a second direct current circuit is coupled to the output of the second mixer inject a direct current thereto.

In another aspect of the present invention, a resonant frequency of the resonant circuit is set at a frequency such that a voltage on the output of the first mixer and a voltage on the output of the second mixer are of a predetermined relationship.

In another aspect of the present invention, the predetermined relationship is equal or approximately equal (as understood in the art).

DETAILED DESCRIPTION OF THE SYSTEM

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not specifically included in the embodiments.

Figure 1:
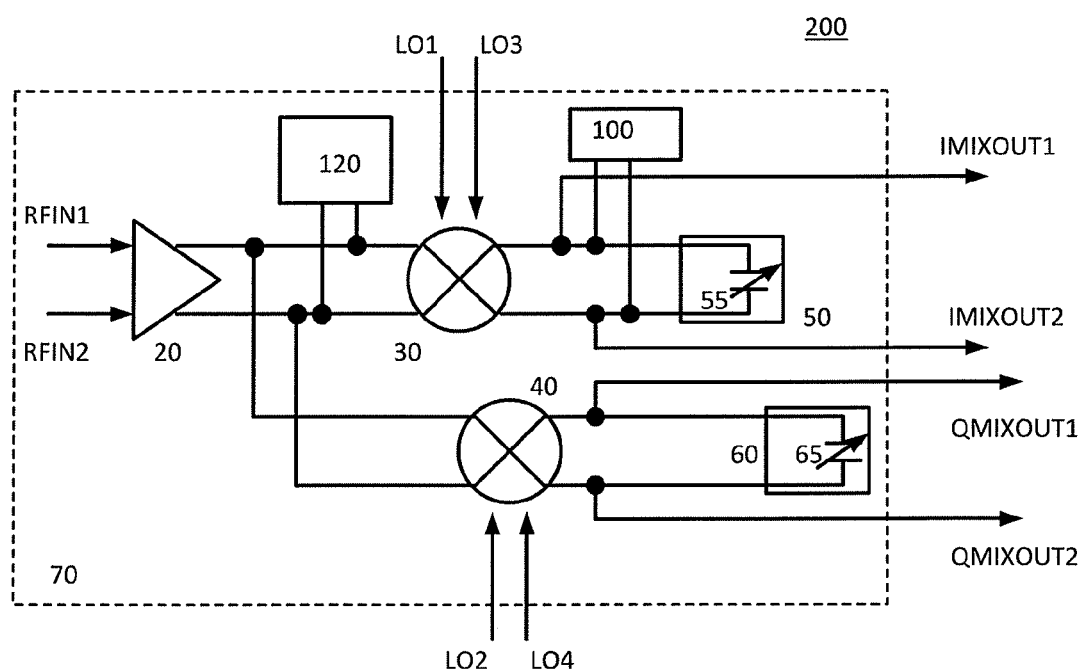
FIG. 1 illustrates an embodiment of present invention.

FIG. 1 illustrates an embodiment 200 of present invention. A front end of an RF receiver includes a low-noise amplifier (LNA) 20 which amplifies received RF input signals RFIN1 and RFIN2. The RF input signals may be received by, e.g., an antenna (not shown) of over-the-air wireless signal. In this case, the RF input signals may be a cell phone signal or a wireless LAN signal. The RF input signals may also be received from a cable or optical cable and may be, e.g., a TV signal.

In this embodiment, the RF input signals RFIN1 and RFIN2 are differential signals. For example, the signals RFIN1 and RFIN2 are a differential pair of an RF signal.

The LNA 20 outputs the amplified signal to an I-mixer 30 and a Q-mixer 40. The I-mixer 30 mixes the amplified signal with a first local oscillator signal LO1 having a frequency LO. The Q-mixer 40 mixes the amplified signal with a second local oscillator signal LO2 also of frequency LO. The first local oscillator signal LO1 and the second local oscillator signal LO2 are approximately 90 degrees out of phase.

While LNA 20 is shown as a single circuit in this embodiment, it is understood in the art that LNA 20 may in fact includes a plurality of low-noise amplifiers. For example, one low-noise amplifier may individually couples to the I-mixer 30, and the another low-noise amplifier may individually couples to the Q-mixer 40.

The I-mixer 30 further mixes the amplified signal with a third local oscillator signal LO3 having a frequency LO. The Q-mixer 40 further mixes the amplified signal with a forth local oscillator signal LO4 also of frequency LO. The third local oscillator signal LO3 is approximately 90 degrees out of phase with the second local oscillator signal LO2. The forth local oscillator signal LO4 is approximately 90 degrees out of phase with the third local oscillator signal LO3.

Figure 2:
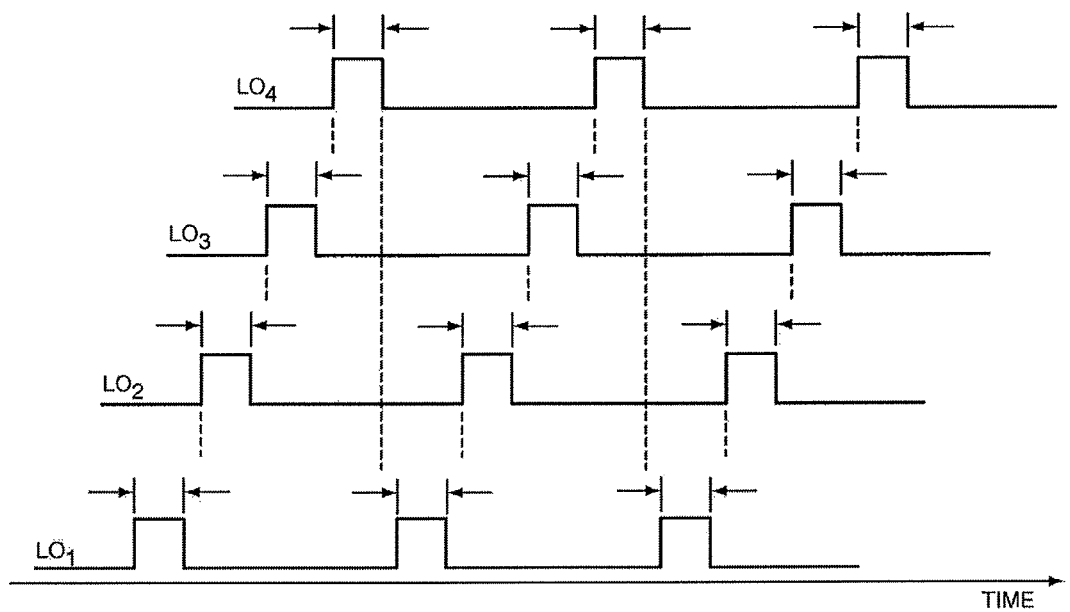
FIG. 2 illustrates the 4-phase local oscillator signals LO1-LO3.

FIG. 2 illustrates the four out-of-phase local oscillator signals. To provide proper isolation between the polyphase reactive circuits 50 and 60, and between the polychase reactive circuits the inputs of the mixers 30 and 40, and to prevent interference between the in-phase (I) and quadrature-phase (Q) inputs of the polyphase reactive circuits 50 and 60, only one of the local oscillator signals LO1, LO2, LO3, and LO4 is active at any given time.

For convenience, the period when LO1 is active is called phase 1. The period when LO2 is active is called phase 2. The period when LO3 is active is called phase 3. The period when LO4 is active is called phase 4.

Figure 3:
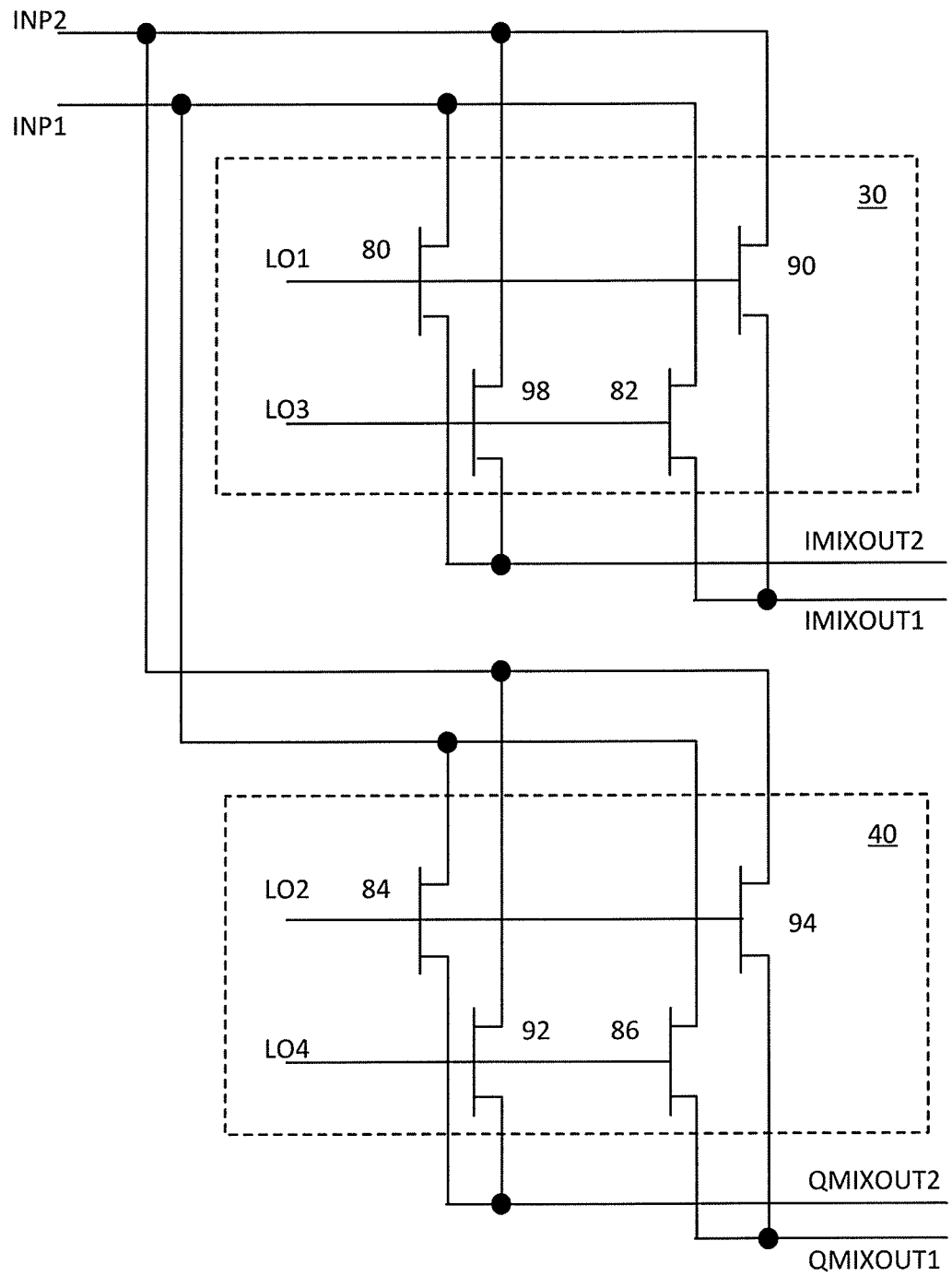
FIG. 3 illustrates an embodiment of the I-mixer and Q-mixer.

FIG. 3 illustrates an embodiment of the I-mixer 30 and Q-mixer 40.
The mixers are differential switching passive mixers using field effect transistors (FETs) as switching elements. The first mixer input INP1 is coupled to the drains of a first in-phase transistor 80, a second in-phase transistor 82, a first quadrature-phase transistor 84, and a second quadrature-phase transistor 86. The second mixer input INP2 is coupled to the drains of a third in-phase transistor 98, a fourth in-phase transistor 90, a third quadrature-phase transistor 92, and a fourth quadrature-phase transistor 94.

The local oscillator signal LO1 is coupled to the gates of the first in-phase transistor 80 and the fourth in-phase transistor 90. The local oscillator signal LO3 is coupled to the gates of the third in-phase transistor 98 and the second in-phase transistor 82.

The local oscillator signal LO2 is coupled to the gates of the first quadrature-phase transistor 84 and the fourth quadrature-phase transistor 94. The local oscillator signal LO4 is coupled to the gates of the third quadrature-phase transistor 92 and the second quadrature-phase transistor 86.

The output signal IMIXOUT1 is coupled to the sources of the fourth in-phase transistor 90 and the second in-phase transistor 82. The output signal IMIXOUT2 is coupled to the sources of the first in-phase transistor 80 and the third in-phase transistor 98. The output signal QMIXOUT1 is coupled to the sources of the fourth quadrature-phase transistor 94 and the second quadrature-phase transistor 86. The output signal IMIXOUT2 is to the sources of the first quadrature-phase transistor 84 and the third quadrature-phase transistor 92.

Thus, at phase 1, the amplified RFIN1 is coupled to one end of the polyphase reactive circuit 50. At phase 3, the amplified RFIN2 is coupled to the other end of the polyphase reactive circuit 50. At phase 2, the amplified RFIN1 is coupled to one end of the polyphase reactive circuit 60. At phase 4, the amplified RFIN2 is coupled to the other end of the polyphase reactive circuit 60.

The mixing process down converts the received RF signal. In a direct downconversion receiver, the mixers 30 and 40 output down-converted signals at the baseband frequency of the received signal. In another type of receiver, the down-converted signals are intermediate frequency (IF) signal.

In FIG. 1, the I-mixer outputs down-converted signals IMIXOUT1 and IMIXOUT2. The Q-mixer outputs down-converted signals QMIXOUT1 and QMIXOUT2. As discussed above, the down-converted signals IMIXOUT1, IMIXOUT2, QMIXOUT1, and QMIXOUT2 may be IF or baseband signals. Further, in this embodiment, since the RF input signals RFIN1 and RFIN2 are differential signals, the down-converted signals IMIXOUT1 and IMIXOUT2 are differential signals, and QMIXOUT1 and QMIXOUT2 are also differential signals.

Downstream from the mixers, as is well known in the art, the down-converted signals IMIXOUT1, IMIXOUT2, QMIXOUT1, and QMIXOUT2 may be further amplified, filtered, and converted to digital domain by an analog-to-digital converter (ADC)(not shown). In the digital domain, the signals may be further processed and demodulated to obtain data carried by the received RF signal.

The output nodes of the mixers are coupled or terminated by polyphase reactive circuits. The output nodes of the I-mixer 30 are coupled to a polyphase reactive circuit 50. The output nodes of the Q-mixer 40 are coupled to a polyphase reactive circuit 60. In this embodiment, the polyphase reactive circuit is a capacitor. In particular, a variable capacitor. As shown in FIG. 1, the polyphase reactive circuit 50 includes a variable capacitor 55, and the polyphase reactive circuit 60 includes a variable capacitor 65.

Other types of polyphase reactive circuit may be used. For example, the polyphase reactive circuit may be a transconductance circuit.

In this embodiment, the LNA 20, I-mixer 30, Q-mixer 40, and polyphase reactive circuits 50 and 60 together function as an embedded filter 70. The output impedance of the LNA 20 functions as an upstream impedance of the filter 70. The characteristics of the embedded filter 70 are based on an impedance divider created by the impedance of the upstream impedance (output impedance of LNA) and the impedance response presented by the mixers. The quality factor of the embedded filter 70 is determined by the impedance of the upstream impedance and losses in mixers 30 and 40 and the polyphase reactive circuits 50 and 60. As the impedance of the upstream impedance increases, the quality factor of the embedded filter 70 increases.

The input ports of the mixers 30 and 40 are coupled to a resonant circuit 120 in the embodiment shown in FIG. 1. The resonant circuit 120 fixes distortion in the phase responses (e.g., the asymmetrical response discussed above). The method for calibrating, setting, or tuning the resonant circuit 120 (and therefore, the resonance frequency) to correction the distortion is set forth herein.

Figure 4:
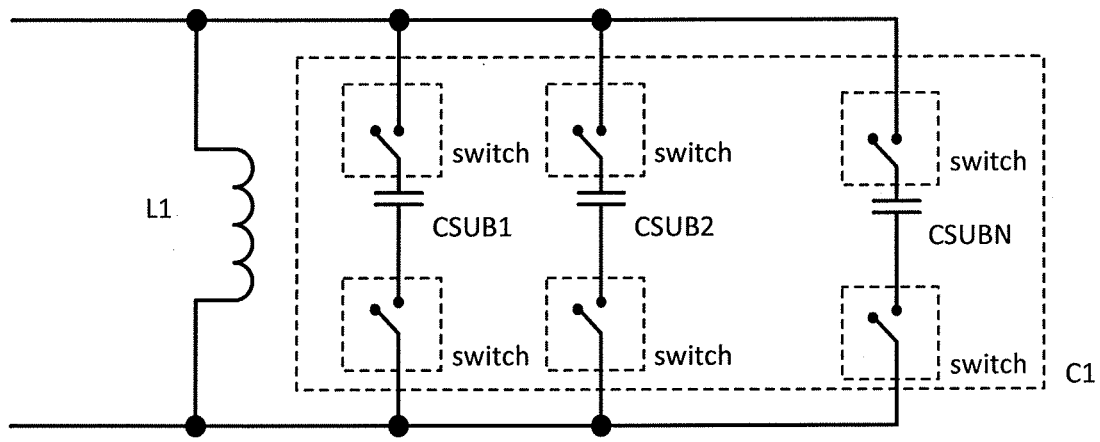
FIG. 4 illustrates an embodiment of the tunable resonant circuit.

FIG. 4 illustrates one embodiment of the resonant circuit 120, which includes an inductance L1 and capacitance C1. In this embodiment, the resonant circuit 120 uses variable capacitance to control the resonance frequency. The variable capacitance is based on a plurality of sub-capacitors CSUB0-CSUBN (i.e., switch capacitors). The resonant circuit 120 thus can be tuned, changing its resonance frequency, by turning on and off the one of the sub-capacitors CSUB0-CSUBN.

Further, the values of the sub-capacitors CSUB0-CSUBN may be substantially different from each other. For example, CSUB0 may be twice the value of CSUB1, and so forth. Such differentiation allows the system to operate in a greater range of resonance frequency.

Further, the resonant circuit 120 may represent a plurality of resonant circuits each couples to the input of the I-mixer 30 and the input of the Q-mixer 40. In this case, the individual resonant circuit be tuned for the I-mixer 30 and the Q-mixer 40 individually.

Figure 5:
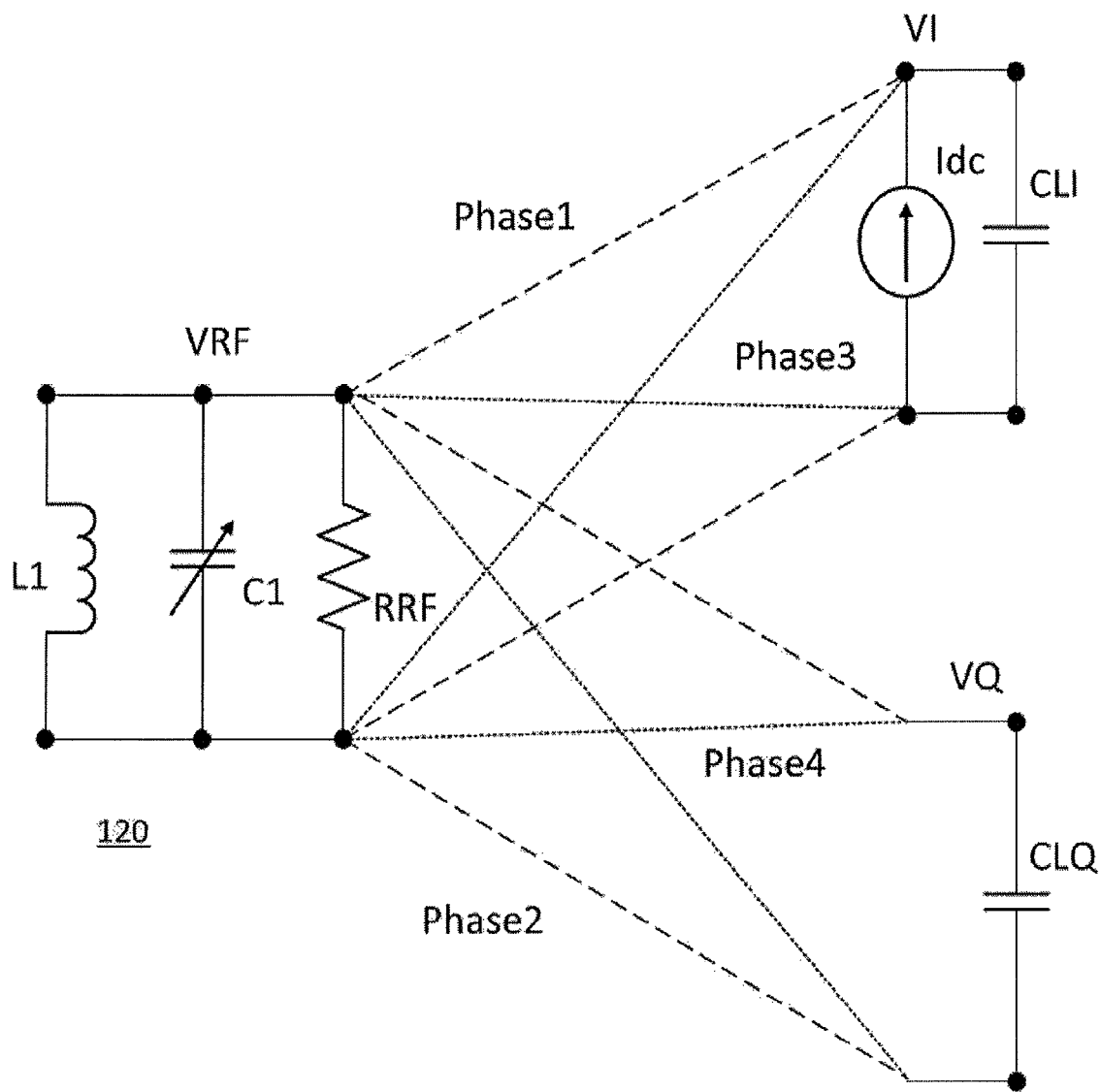
FIG. 5 illustrates an equivalent diagram for an operation of present invention.
Figure 6:
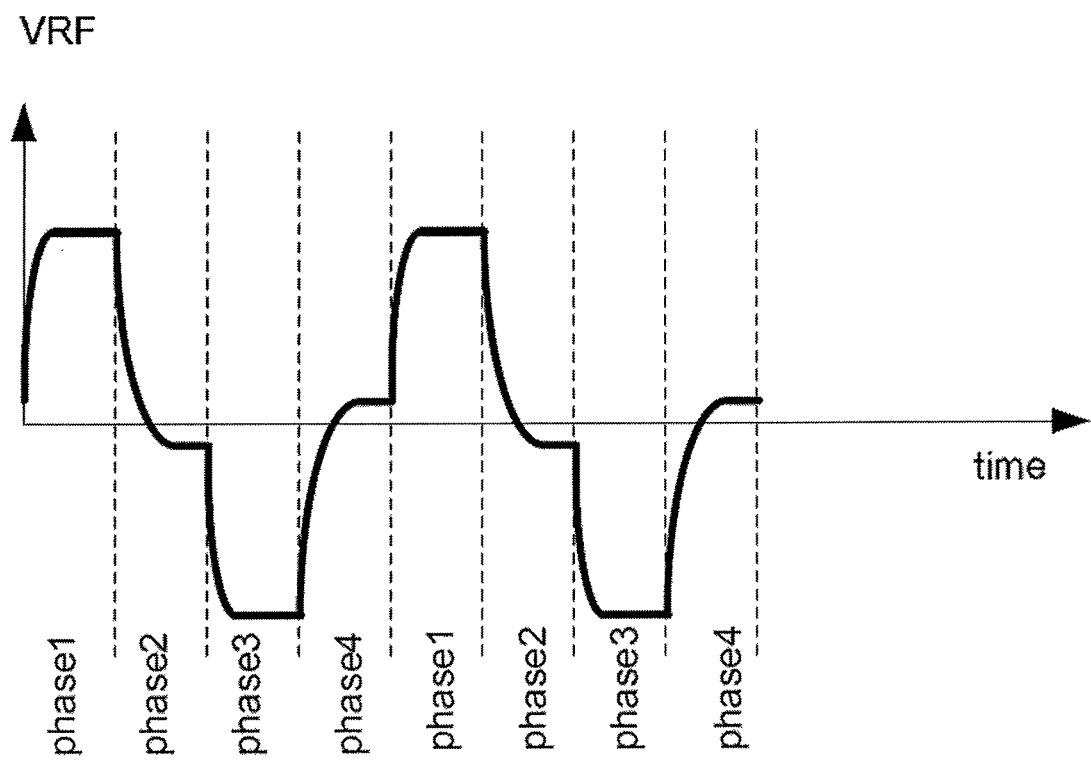
FIG. 6 illustrates the voltage at the common input of the mixer when the RF circuit it tuned.

FIG. 5 illustrates the equivalent circuitry of the RF receiver. FIG. 6 illustrates the voltage response VRF at the common input node shared by first mixer 30 (I-mixer) and second mixer 40 (Q-mixer) in the 4 phases on local oscillation signals.

The direct current circuit 100 is coupled to the IMIXOUT1 and IMIXOUT2 output nodes of the first mixer 30 (I-mixer). The direct current circuit 100 injects a positive current into IMIXOUT1 and a negative current into IMIXOUT2. A direct current circuit is well known is the art and therefore, needs not be discussed here.

In FIG. 5, the direct current circuit 100 is represented by current source $I_{dc}$.

The first polyphase reactive circuit 50 is represented by a capacitor CLI. The second polyphase reactive circuit 60 is represented by a capacitor CLQ. The resonant circuit 120 is represented by an inductor L and a variable capacitor C. The RRF (i.e., RF resistance) represent an upstream impedance of the RF receiver (e.g., as discussed above, the output impedance of the LNA 20).

At phase 1, the IMIXOUT1 node is coupled to one end of the common input. The direct current quickly charges the one end of the common input to a positive polarity. VRF is determined by the direct current and RRF.

At phase 2, the one end of the common input is coupled to the QMIXOUT 1 node. VRF is discharged by the operation of inductor L, variable capacitor C, and CLQ.

At phase 3, the IMIXOUT2 node is coupled to the one end of the common input. The direct current quickly charges the one end of the common input to a negative polarity. VRF is determined by the direct current and RRF.

At phase 4, the one end of the common input is coupled to the QMIXOUT 2 node. VRF is discharged (to the positive polarity) by the operation of inductor L, variable capacitor C, and CLQ.

If the overall resonance frequency (which is a function of inductor L and variable capacitor C) and the excitation from the mixers are aligned, there will be no significant coupling from CLI to CLQ. In the case, the voltage across CLQ is uncharged.

Accordingly, the RF receiver may be calibrated or tuned by adjusting the resonant circuit 120 such the voltage across CLQ (the polyphase reactive circuit 60) is a predetermined voltage. In this embodiment, the predetermined voltage is zero.

Figure 7:
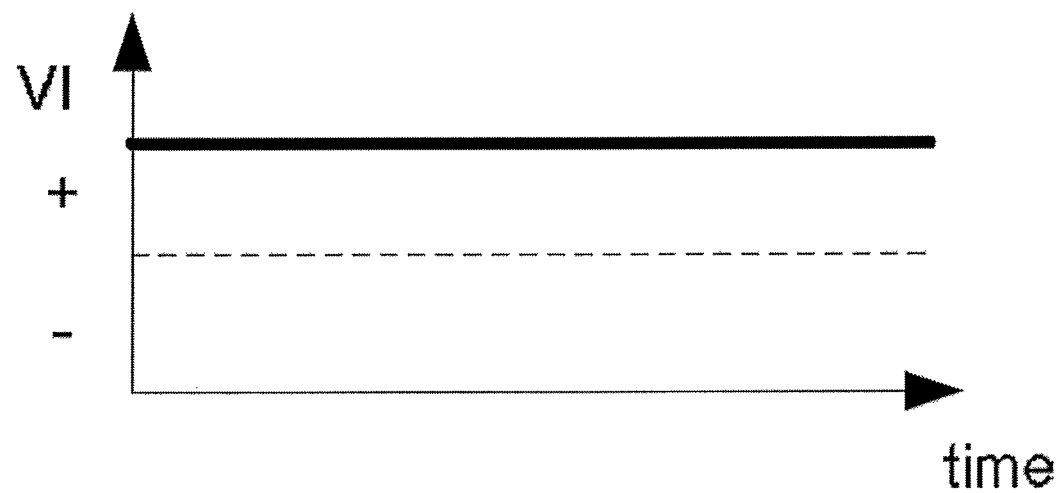
FIG. 7 illustrates the steady-state VI and VQ voltages when the RF circuit is tuned.
Figure 7:
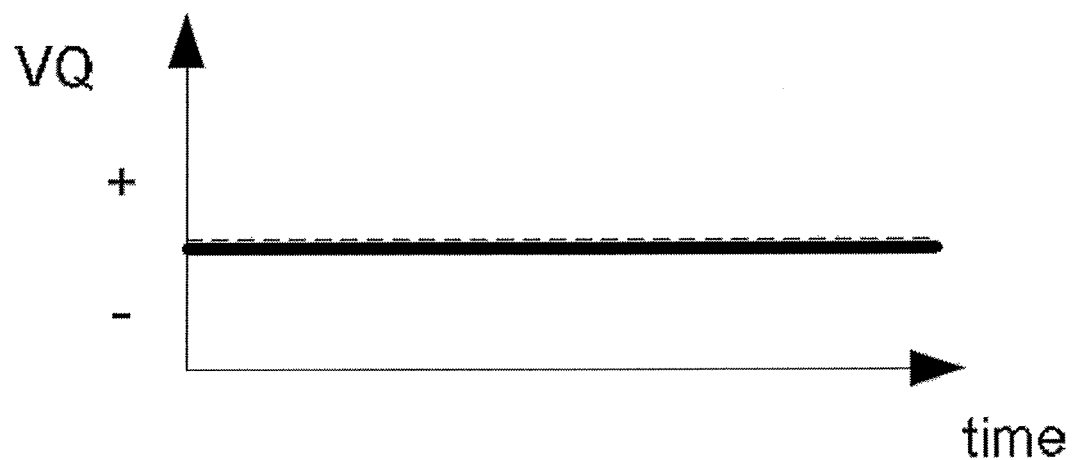

FIG. 6 illustrates the voltage response of VRF in such case.
FIG. 7 illustrates the steady-state voltage across CLI (VI) and the voltage across CLQ (VQ).

If, for example, when there is a significant phase shift at the RF port under the phase 1-phase 3 excitation, negative charges accumulate on CLQ (the polyphase reactive circuit 60). The voltage across the polyphase reactive circuit 60 is a negative voltage instead of zero in this case.

Figure 8:
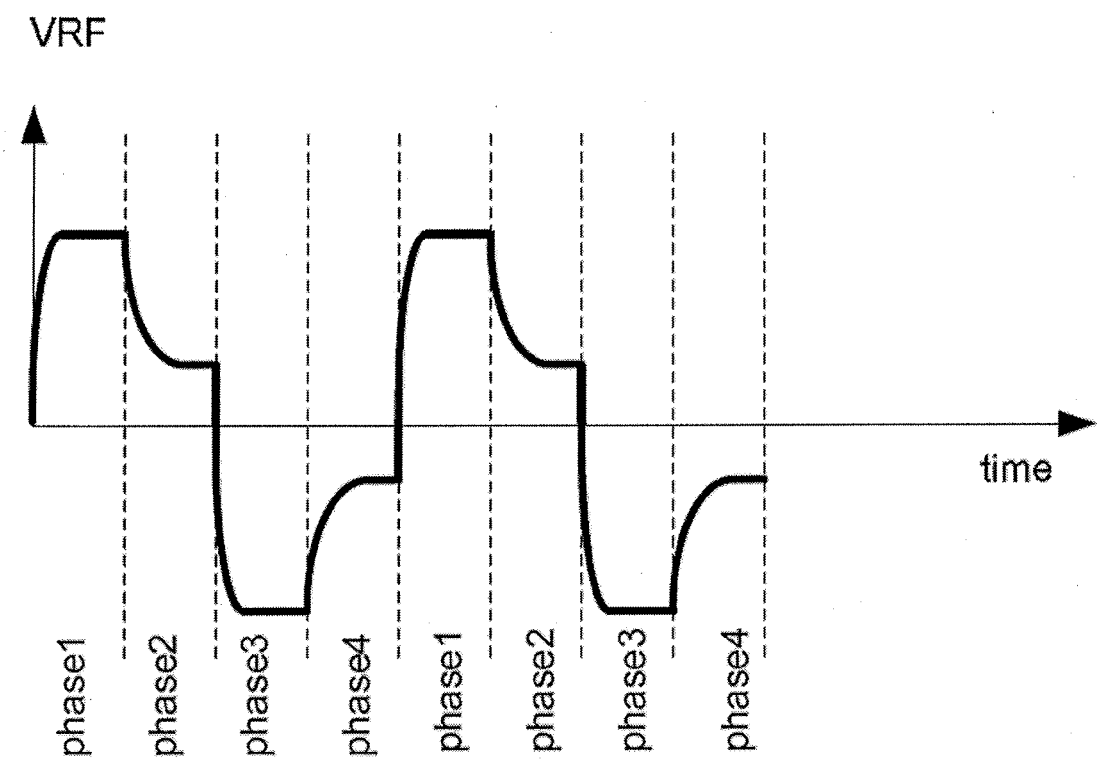
FIG. 8 illustrates the voltage at the common input of the mixer when the RF circuit is not tuned.
Figure 9:
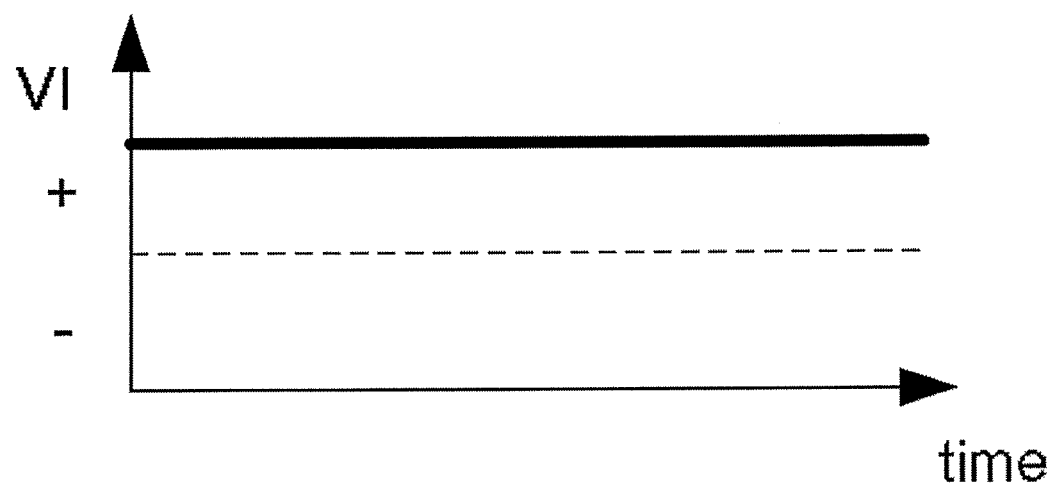
FIG. 9 illustrates the steady-state VI and VQ voltages when the RF circuit is not tuned.
Figure 9:
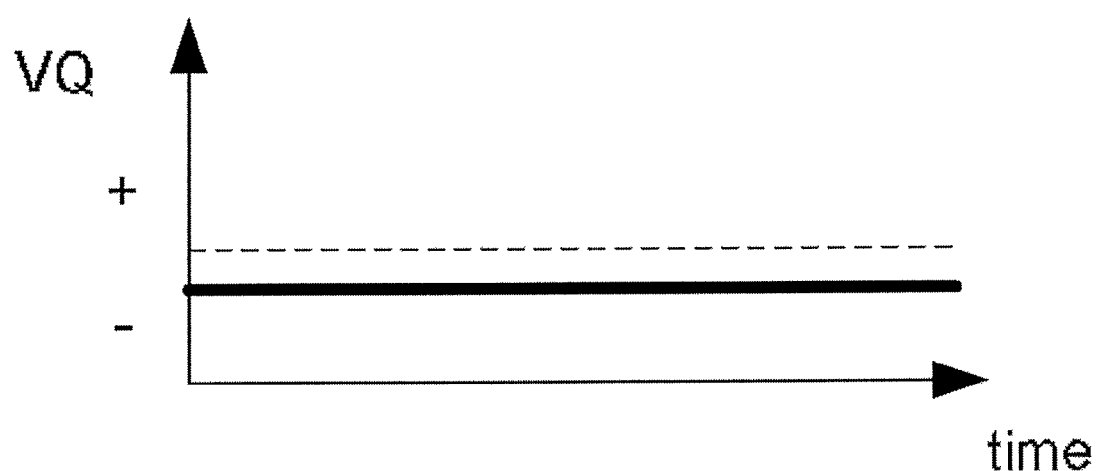

FIG. 8 illustrates the voltage response of VRF in such case.
FIG. 9 illustrates the steady-state voltage across CLI (VI) and the voltage across CLQ (VQ).

Figure 10:
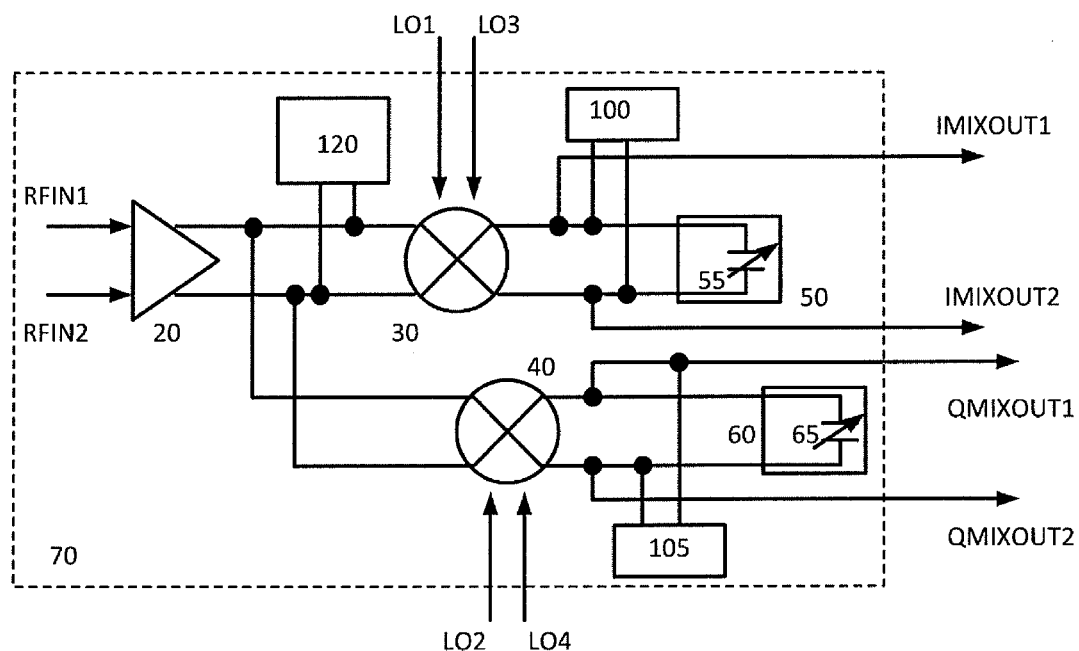
FIG. 10 illustrates another embodiment of present invention.

FIG. 10 illustrates another embodiment 250. Here, the direct current circuit 100 is coupled to the IMIXOUT1 and IMIXOUT2 output nodes of the first mixer 30 (I-mixer), and a direct current circuit 105 is coupled to QMIXOUT1 and QMIXOUT2 output nodes of the second mixer 40 (Q-mixer). The direct current circuit 100 injects a positive current into IMIXOUT1 and a negative current into IMIXOUT2, and direct current circuit 105 injects a positive current into QMIXOUT1 and a negative current into QMIXOUT2. Since the paths of I-mixer and Q-mixer are symmetrical, the effects of the above embodiment shown in FIG. 1 are duplicated on both the I path and the Q path. That is, when the system is balanced, the same voltage should be found on both CLI and CLQ.

Thus, in the embodiment, the system is calibrated or tuned by adjusting the resonant circuit 120 such that the voltages on CLI and CLQ meet a predetermined relationship (e.g., equal).

The setting or calibration method discussed above may be performed by the manufacture of the RF receiver device or a module incorporating the RF receiver. For example, the setting or calibration method is performed after the device or module is manufactured before sending the device or module to a customer.

Moreover, the setting or calibration method may be formed automatically. For example, the setting or calibration method may be performed every time the device is powered up. Or, the setting or calibration method may be performed periodically to make sure the RF receiver is properly set. In this case, the control circuit may be a small processing unit or processer integrated on the RF receiver device or module. A non-transient computer readable medium (such as NAND or ROM memory) stores the control program. The program operates processing unit or processer to perform the setting or calibration method in the RF receiver discussed above.

In another embodiment, the system includes a temperature sensor (not shown). When a calibration process starts, the system sets the resonant circuit 120 to a setting based on the temperature. I.e., the system sets at least one of CSUB0-CSUBN based on the temperature.

Those skilled in the art will recognize improvements and modifications to the preferred embodiments of the present invention. All such improvements and modifications are considered within the scope of the concepts disclosed herein and the claims that follow.

What is claimed is:

1. A radio frequency (RF) receiver comprising: a first mixer receiving an RF signal; a second mixer receiving the RF signal; a resonant circuit coupled to an input of the second mixer; a direct current circuit coupled to an output of the first mixer to inject a direct current thereto, wherein a resonant frequency of the resonant circuit is set at a frequency such that a voltage on the output of the second mixer is a predetermined voltage, wherein the resonant circuit comprises a switch capacitor, and the frequency of the resonant circuit is set by changing a switching state of the switch capacitor, and wherein the switch capacitor is a first switch capacitor, and the resonant circuit further comprises a second switch capacitor; wherein a capacitance of the first switch capacitor is twice or more of a capacitance of the second switch capacitor.

2. The RF receiver of claim 1, wherein the first mixer is a I-mixer, and the second mixer is a Q-mixer, and the input of the I-mixer and the input of the Q-mixer receive an RF signal, the I-mixer and the Q-mixer mix the RF signal with at least one local oscillator signal; wherein the I-mixer outputs an in-phase down-converted signal, and the Q-mixer outputs an quadrature down-converted signal.

3. The RF receiver of claim 1, wherein the first mixer mixes a first local oscillator signal and the received RF signal, and the second mixer mixes a second local oscillator signal and the received RF signal, the first mixer mixes a third local oscillator signal and the received RF signal, and the second mixer mixes a forth local oscillator signal and the received RF signal, wherein the first local oscillator signal, the second local oscillator signal, the third local oscillator signal, and the forth local oscillator signal are out of phase and non-overlapping.

4. The RF receiver of claim 3, wherein a received RF signal is a differential signal coupled to a first node and a second node of the input of the first mixer and a first node and a second node of the input of the second mixer; the first mixer outputs a differential signal coupled to a first node and a second node of the output of the first mixer; and the second mixer outputs a differential signal coupled to a first node and a second node of the output of the second mixer.

5. The RF receiver of claim 4, wherein when the first local oscillator signal is active, the first node of the common input is coupled to the first node of the output of the first mixer; when the second local oscillator signal is active, the first node of the common input is coupled to the first node of the output of the second mixer; when the third local oscillator signal is active, the second node of the common input is coupled to the second node of the output of the first mixer; and when the forth local oscillator signal is active, the second node of the common input is coupled to the second node of the output of the second mixer.

6. A radio frequency (RF) receiver comprising: a first mixer receiving an RF signal; a second mixer receiving the RF signal; a resonant circuit coupled to an input of the second mixer; a direct current circuit coupled to an output of the first mixer to inject a direct current thereto, wherein the direct current circuit coupled to the output of the first mixer is a first direct current circuit, and the RF receiver further comprises: a second direct current circuit coupled to an output of the second mixer to inject a direct current thereto, and wherein the resonant circuit is coupled to an input of the first mixer, wherein a resonant frequency of the resonant circuit is set at a frequency such that a voltage on the output of the first mixer and a voltage on the output of the second mixer is of a predetermined relationship, wherein the resonant circuit comprises a switch capacitor, and the frequency of the resonant circuit is set by changing a switching state of the switch capacitor, wherein the switch capacitor is a first switch capacitor, and the resonant circuit further comprises a second switch capacitor; wherein a capacitance of the first switch capacitor is twice or more of a capacitance of the second switch capacitor.

7. The RF receiver of claim 6, wherein the predetermined relationship is configured such that the voltage on the output of the first mixer and the voltage on the output of the second mixer are equal.

8. The RF receiver of claim 6, wherein the first mixer is a I-mixer, and the second mixer is a Q-mixer; wherein the input of the I-mixer and the input of the Q-mixer receive an RF signal; the I-mixer and Q-mixer mix the RF signal with at least one local oscillator signal; wherein the I-mixer outputs an in-phase down-converted signal, and the Q-mixer outputs an quadrature down-converted signal.

\* \* \* \* \*